(12) United States Patent
Orms

(10) Patent No.: US 10,953,993 B2
(45) Date of Patent: Mar. 23, 2021

(54) PARACHUTING HARNESS

(71) Applicant: Robert Kent Orms, Bozeman, MT (US)

(72) Inventor: Robert Kent Orms, Bozeman, MT (US)

( * ) Notice: Subject to any disclaimer, the term of this patent is extended or adjusted under 35 U.S.C. 154(b) by 314 days.

(21) Appl. No.: 16/151,211

(22) Filed: Oct. 3, 2018

(65) Prior Publication Data

US 2019/0100320 A1    Apr. 4, 2019

Related U.S. Application Data

(60) Provisional application No. 62/567,566, filed on Oct. 3, 2017.

(51) Int. Cl.
*B64D 17/30* (2006.01)
*B64D 17/40* (2006.01)

(52) U.S. Cl.
CPC ............. *B64D 17/30* (2013.01); *B64D 17/40* (2013.01)

(58) Field of Classification Search
CPC ................................ B64D 17/30; B64D 17/40
See application file for complete search history.

(56) References Cited

U.S. PATENT DOCUMENTS

| | | | | |
|---|---|---|---|---|
| 1,332,143 A * | 2/1920 | Osterday | ................ | B64D 17/40 244/147 |
| 1,385,773 A * | 7/1921 | Boland | .................. | B64D 17/30 244/151 R |
| 1,560,366 A * | 11/1925 | Ball | ........................ | B64D 17/30 244/151 R |
| 1,842,611 A * | 1/1932 | Irvin | ...................... | B64D 17/30 244/148 |
| 1,871,223 A * | 8/1932 | Reese | ........................ | A45F 3/10 224/648 |
| 1,958,000 A * | 5/1934 | Hamer | .................... | B64D 17/30 244/148 |
| 4,720,064 A * | 1/1988 | Herndon | ................ | B64D 25/06 244/122 AG |
| 5,179,743 A * | 1/1993 | Lanman | ................ | A47C 21/022 24/465 |
| 6,253,874 B1 * | 7/2001 | Casebolt | ............ | A62B 35/0031 182/3 |
| 9,120,575 B1 * | 9/2015 | Storms, Jr. | ............. | B64D 17/40 |
| 9,179,758 B2 * | 11/2015 | Calilung | ............... | A47D 13/025 |
| 9,610,917 B2 * | 4/2017 | Fleming | .................. | B60R 22/02 |
| 2009/0071749 A1 * | 3/2009 | Burlaud | ................ | A62B 35/04 182/3 |

* cited by examiner

*Primary Examiner* — Justin M Benedik
(74) *Attorney, Agent, or Firm* — Erickson Kernell IP, LLC

(57) ABSTRACT

A cargo harness comprising a first diagonal strap, a second diagonal strap overlapping the first diagonal strap at a X-crossing. The first diagonal strap may be coupled to the second diagonal strap at a first joint. The cargo harness may also include a cross strap having a first end, a second end and a sleeve disposed between the first end and the second end, wherein the first diagonal strap and the second diagonal strap pass through the sleeve and the sleeve overlaps at least a portion of the x-crossing. In one embodiment, the cargo harness may include a dual-point release strap assembly operably connected to the first and second diagonal strap for connecting a cargo load to a parachute harness.

10 Claims, 6 Drawing Sheets

PARACHUTING HARNESS

CROSS-REFERENCE TO RELATED APPLICATIONS

This application claims the priority benefit of U.S. Provisional Application Ser. No. 62/567,566, filed on Oct. 3, 2017, entitled "PARACHUTING HARNESS," the entire disclosure of which is incorporated herein by reference.

BACKGROUND

Military airborne operations have employed in military and special operations activities shortly after the invention of the airplane. The airborne divisions of the allied forces in World War II were widely used to place troops in strategic locations behind enemy lines. Since the inception of the use of airborne troops, there has been a need to supply these troops with the tools and supplies they need to successfully carry out their operations.

There is a need to bring in food and water, weapons, ammunition, explosives, clothing, radios, tents, portable shelters, etc. One challenge is how to carry these supplies and ensure a safe landing. Traditionally, the airborne troops utilize an H-harness in conjunction with an ALICE pack as a system that allows the soldier to carry in needed supplies. H-harness may also technically be referred to as the HSPR (H-Single Point Release), but we'll refer to it as the H-harness in this disclosure. FIG. 1A shows an ALICE pack. As can be appreciated, the H-harness will fit around and between the three pockets of the ALICE pack. It is the engagement of the H-shape with the large central pocket of the ALICE pack that provides stability and a solid reliable retention of the ALICE pack on a parachutist.

More recently, the MOLLE and MOLLE II packs have replaced ALICE pack as standard issue, though the same issues arise as the MOLLE and MOLLE II were designed with the H-harness in mind. The H-harness is compatible with the MOLLE and MOLLE II packs as the h-strap fits between pockets. The same functional issues related to the single release of the H-harness and limitation as to what cargo and what can be carried into a combat situation. FIG. 1B shows a MOLLE pack and FIG. 1C shows a MOLLE II pack.

The soldier has the ALICE, MOLLE, or MOLLE II pack strapped to his/her H-harness in transport and during the descent, and the soldier releases the pack on a tether prior to landing so that the pack is below the soldier and hits the ground prior to landing by the soldier using the single release of the H-harness. This reduces the weight of the soldier during impact and reduces injuries, but because there is only a single release mechanism, all of the weight of the pack may be released which may distract or otherwise disrupt the trajectory of the parachutist. If not controlled correctly and the pack drops suddenly, this could act as a pendulum and affect the balance of the parachutist during landing. Thus, there is a need in the art for a harness and a dual-release mechanism that allows for a more controlled release of the pack using the tether.

Further, in modern day warfare and special operations, the use of the current H-harness in combination with the ALICE, MOLLE, or MOLLE II pack is too limiting in the type of pack and load, and does not provide flexibility in the size or shape of the load. For example, the load could be a civilian pack, a duffel bag, a tent, a cooler, or any other item which may be desirable for a given mission. Because the existing H-harness is only compatible with the ALICE, MOLLE, or MOLLE II pack, the flexibility required for today's military operations is missing. Thus, there is a need for different sized and shape packs or other items to be carried into a combat zone or other location by a parachutist. Accordingly, there is a need in the art for a harness system that provides the flexibility to carry in a number of different items into a combat or mission zone by a military parachutist.

Further, as combat missions have become more diverse, there is a need in the art for a lightweight, stowable, and compact harness for cargo or bags carried into a combat zone by a military parachutist.

SUMMARY OF THE INVENTION

The present invention is an adjustable, diagonal-strap pack harness having a number of applications and use with varying types of cargo, with one embodiment intended for use with military parachuting. The harness may comprise a first diagonal strap and a second diagonal strap that cross at an X-crossing. The first diagonal strap may be coupled to second diagonal strap at both a first connection joint and a second connection joint. The harness may further include a cross strap that is positioned relative to first diagonal strap and second diagonal strap at or near the x-crossing 16, wherein, the cross strap may include a sleeve formed therein by an overlap of material or other method that define an aperture acting as sleeve in cross strap. Both first diagonal strap and second diagonal strap may pass through sleeve to operably connect the cross strap and the diagonal straps.

First and second strap first ends may each include a buckle 38 disposed thereon. Buckle may be a friction adapter or any other known buckle in the art. Further, first strap and second strap may each include a connector disposed between cross strap and first ends. Connector may be used as a tie-in for one or more straps to connect to a jump harness worn by a parachutist. Connector may be a friction adapter or other webbing connector known in the art. Cross strap may include a third length defined by a cross strap first end and a cross strap second end, wherein cross-strap first end may have a buckle disposed thereon. Buckle may be a friction adapter or other known webbing connector. Straps may be made from nylon webbing or other known webbing and, in one embodiment, may include any known buckle or friction adapter to secure harness around the load or pack.

The harness may include a dual-point release strap assembly to rig combat packs to the parachute harness via snap shackles or other quick release adapters. Dual-point release strap assembly may include a first strap, a second strap, wherein each of first strap and second strap include an adjuster buckle disposed thereon. First strap may have a length defined by a first end and a second end and second strap has a length defined by a first end and a second end. The second end of these straps of the dual-release straps and may be rolled or S-folded upon itself as a folded end to provide length when needed, but creating a tidy end for jumping and maneuvering when the harness and dual-point release strap assembly is connected to a parachutist. Each of first strap and second strap may include a releasable connector/shackle disposed on each of its first ends.

Dual point release strap assembly may include a leash strap spanning between shackle of first strap and shackle of second strap. Leash strap may be operably connected to the shackles and so that a parachutist can selectively release one or both shackles. In one embodiment, leash strap may comprise a first strap operably connected to shackle of first strap and a second leash strap operably connected to shackle of second strap. First leash strap and second leash strap may be connected to each other with hook and loop fastener, buckles, friction connections, or any other connection method or device now known or hereafter developed. First leash strap and second leash strap may be able to be connected together to provide different lengths of leash strap. In addition, adjuster buckle allows a user to adjust a length of strap between buckle and shackle.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION

Figure 1A:
FIG. 1A is a front view of a prior art ALICE backpack.
Figure 1B:
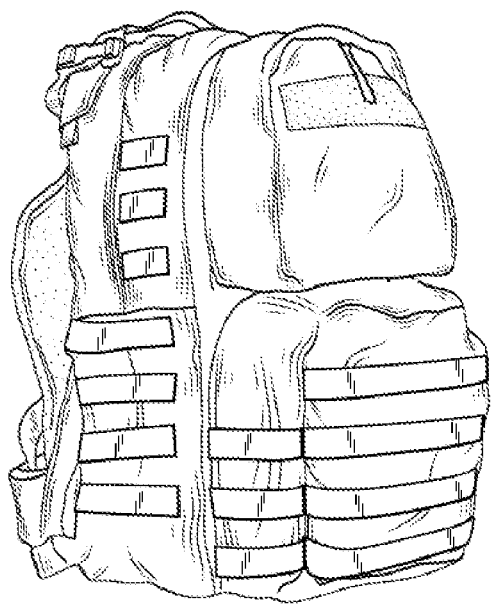
FIG. 1B is a side perspective view of a prior art MOLLE backpack.
Figure 1C:
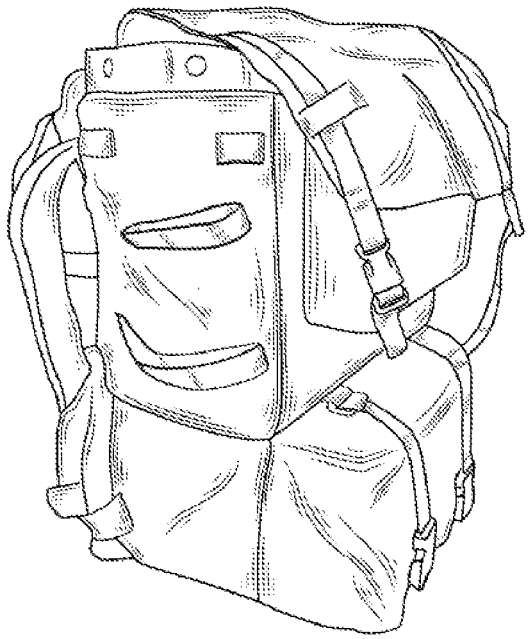
FIG. 1C is a side perspective view of a prior art MOLLE II backpack.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
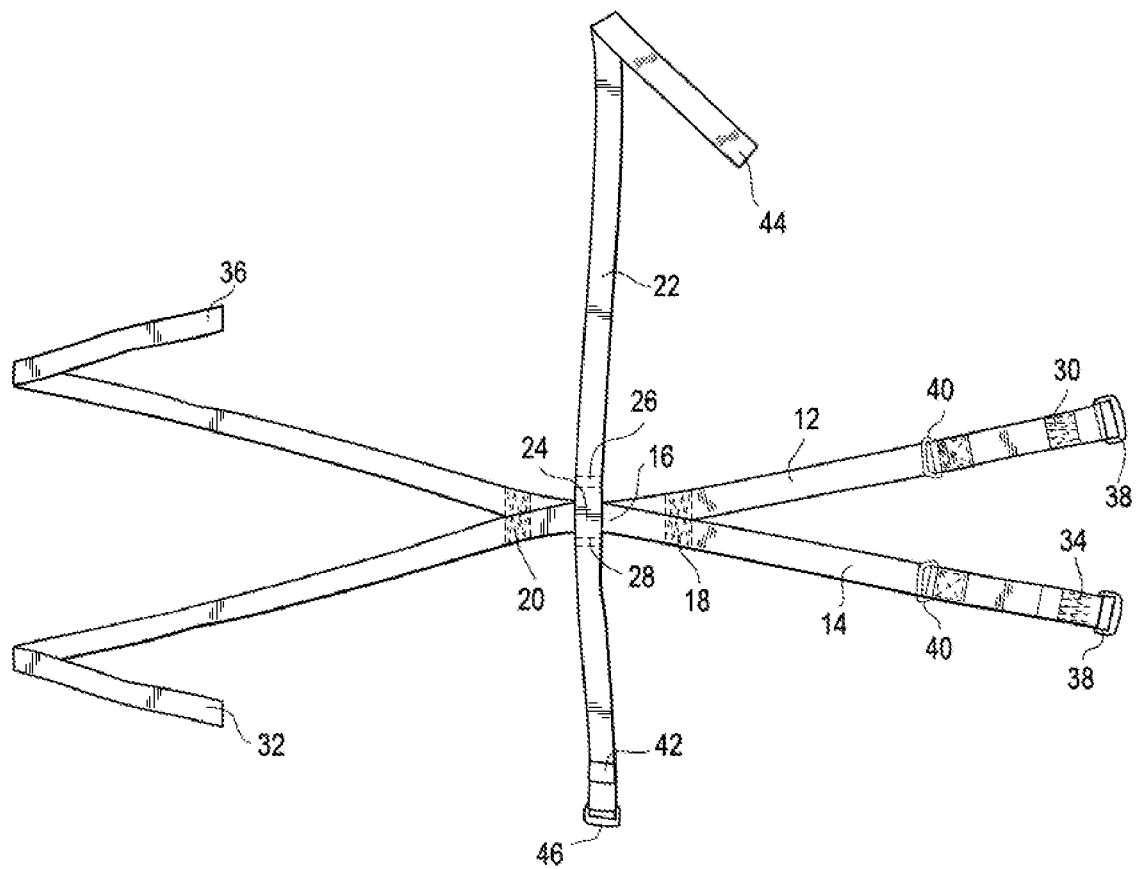
FIG. 2 is a top view of one embodiment of a parachute harness in accordance the teachings of the present disclosure.
Figure 2:
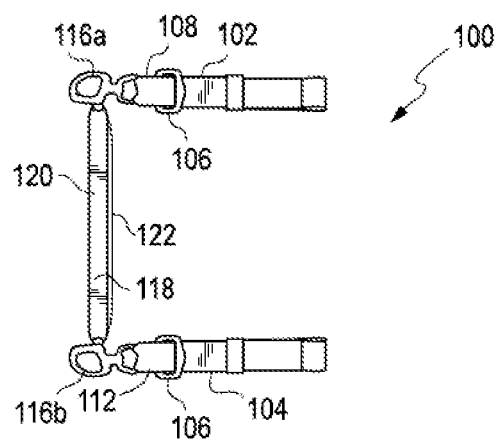

The present harness 10 is an adjustable, diagonal-strap pack harness with one embodiment intended for use with military parachuting. As shown in FIG. 2, the present invention is direct toward a harness 10 comprising a first diagonal strap 12 and a second diagonal strap 14 that cross at an X-crossing 16. The first diagonal strap 12 is coupled to second diagonal strap 14 at both a first connection joint 18 and a second connection joint 20. Connection joints 18 and 19 may be a sewn joint or may be any other coupling method such as a fabric weld, rivet, adhesive, or other coupling device. Harness 10 further includes a cross strap 22 that is positioned relative to first diagonal strap 12 and second diagonal strap 14 at or near the x-crossing 16. Cross strap 22 may include a sleeve 24 formed therein by an overlap of material or other method wherein sleeve 24 is defined by a first joint 26 and a second joint 28 that define an aperture acting as sleeve 24 in cross strap 22. Both first diagonal strap 12 and second diagonal strap 14 may pass through sleeve 24 to operably connect the cross strap 22 and the diagonal straps 12 and 14. As can be appreciated by a person of skill in the art, sleeve 24 may have a length that allows cross strap 22 to be slid along a portion of both first diagonal strap 12 and second diagonal strap 14 as necessary depending upon the size of the pack or item to be carried, but that provides a limit in the distance that cross-strap can slide relative to the diagonal straps 12 and 14.

As can be further seen in FIG. 2, first diagonal strap includes a first length defined by a first strap first end 30 and a first strap second end 32. Second diagonal strap 14 includes a second length defined by a second strap first end 34 and a second strap second end 36. First strap first end 30 and second strap first end 34 may each include a buckle 38 disposed thereon. Buckle 38 may be a friction adapter or any other known buckle in the art. Further, first strap 12 and second strap 14 may each include a connector 40 disposed between cross strap 22 and first ends 30 and 34. Connector 40 may be used as a tie-in for one or more straps to connect to a jump harness (see FIG. 4). Connector 40 may be a friction adapter or other webbing connector known in the art. Cross strap 22 may include a third length defined by a cross strap first end 42 and a cross strap second end 44, wherein cross-strap first end 42 may have a buckle 46 disposed thereon. Buckle 46 may be a friction adapter or other known webbing connector. Straps 12, 14 and 22 may be made from nylon webbing or other known webbing and, in one embodiment, may include any known buckle or friction adapter to secure harness 10 around the load or pack.

As shown in FIG. 2, in one embodiment, a dual-point release strap assembly 100 may be used with harness 10 to rig combat packs to the parachute harness via snap shackles 116 or other quick release adapters. Dual-point release strap assembly 100 may include a first strap 102, a second strap 104, wherein each of first strap 102 and second strap 104 include an adjuster buckle 106 disposed thereon. First strap 102 has a length defined by a first end 108 and a second end (not shown as first strap 102 is folded in upon itself in FIG. 2) and second strap 104 has a length defined by a first end 112 and a second end (not shown as second strap 104 is folded in upon itself in FIG. 2). The second end of straps 102 and 104 may be rolled or S-folded upon itself as a folded end to provide length when needed, but creating a tidy end for jumping and maneuvering when the harness and dual-point release strap assembly 100 is connected to a parachutist. Each of first strap 102 and second strap 104 have a releasable connector/shackle 116 disposed on its first end 108 and 112 respectively. Dual point release strap assembly 100 includes a leash strap 118 spanning between shackle 116a of first strap and shackle 116b of second strap. Leash strap 118 is operably connected to the shackles 116a and 116b so that a parachutist can selectively release one or both shackles. In one embodiment, leash strap 118 comprises a first strap 120 operably connected to shackle 116a of first strap 102 and a second leash strap 122 operably connected to shackle 116b of second strap 104. First leash strap 120 and second leash strap 122 may be connected to each other with hook and loop fastener, buckles, friction connections, or any other connection method or device now known or hereafter developed. First leash strap 120 and second leash strap 122 may be able to be connected together to provide different lengths of leash strap 118. In addition, adjuster buckle 106 allows a user to adjust a length of strap between buckle 106 and shackle 116.

As shown in FIG. 3, one embodiment of harness 10 may be used to encase a backpack 200 and provide attachment to parachute harnesses for use in military parachute operations. The webbing straps 12, 14, and 22 wrap around the backpack 200 and through buckles 38, 46 that tighten down to give a secure bundle that won't release under the stress of jumping.

Figure 3A:
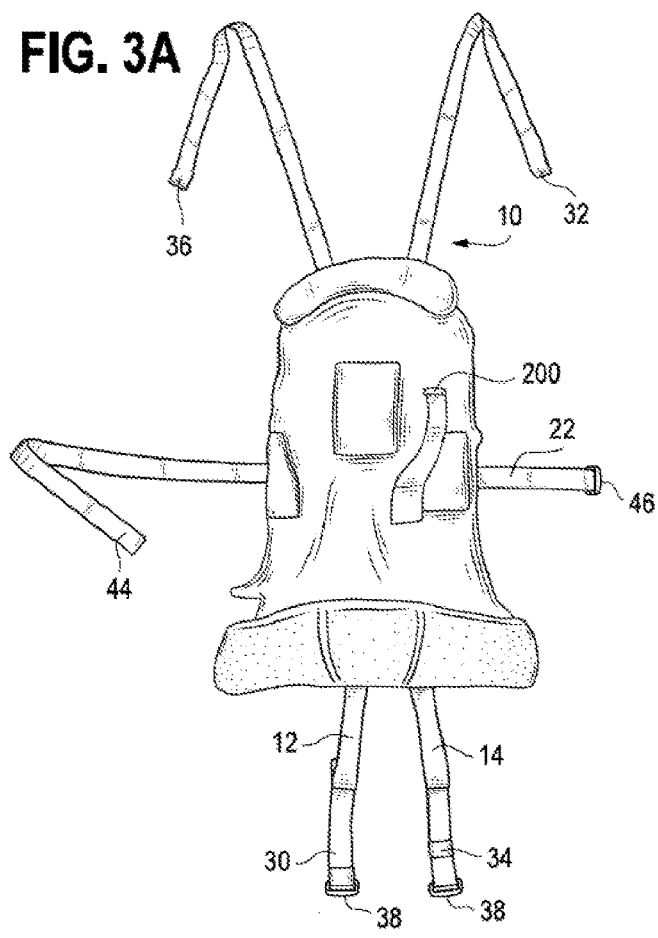
FIG. 3A is a back view of one embodiment of a harness in accordance the teachings of the present disclosure during one step of installation of the parachute harness on a backpack.

In use, a parachutist places the pack 200 on harness 10 with the outer pockets facing down, and frame up (see FIG. 3A). The top 202 of pack 200 may facing free ends 32, 36 of main harness webbing being first diagonal strap 12 and second diagonal strap 14. At this point, the connectors 40 of each strap 12 and 14 should be sticking out around 10 inches from under the bottom 206 of pack 200.

Figure 3B:
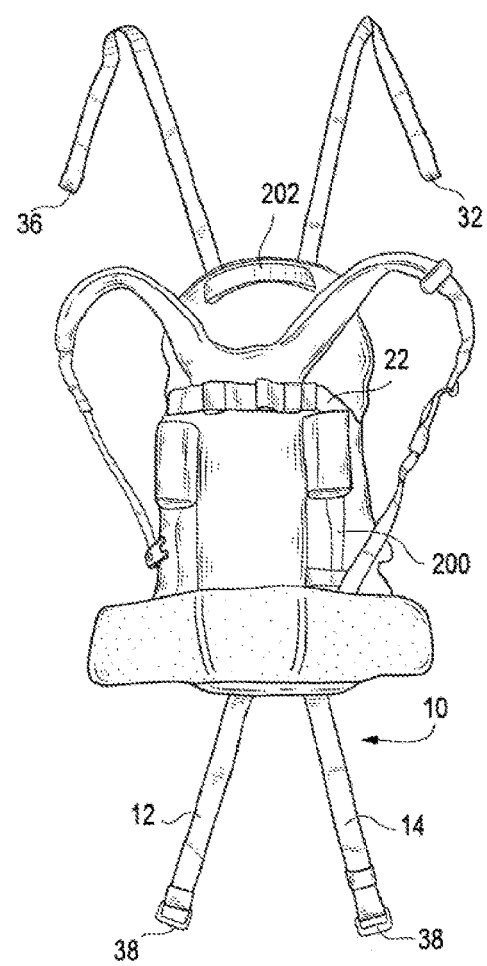
FIG. 3B is a back view of the embodiment of FIG. 3A during another step of installation of the parachute harness on a backpack.
Figure 3C:
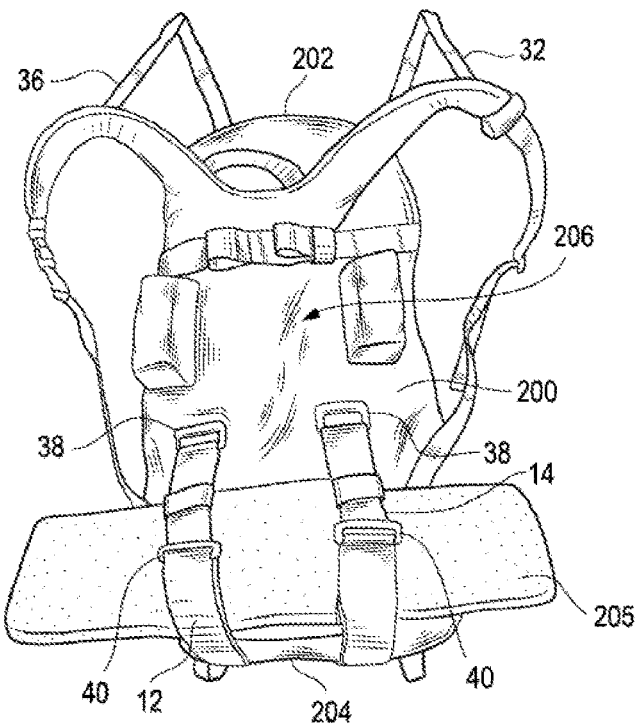
FIG. 3C is a back view of the embodiment of FIG. 3A during another step of installation of the parachute harness on a backpack.

The parachutist or pack loader will then route cross strap 22 around pack 200 as shown in FIG. 3B, and mate end 44 into respective buckle/friction adapter 46. Next, parachutist or pack loader may routes the buckles/friction adapters 38 of first diagonal strap 12 and second diagonal strap 14 around bottom 204 of pack 200, and through webbing on bottom 204 of pack 200 if present (see FIG. 3C). As shown in FIG. 3C, the connectors 40 of each strap 12 and 14 should be on inside edge of a waist belt 205 of pack 200 and facing outward away from pack 200. Parachutist or pack loader may continue to route free ends 32 and 36 of diagonal straps 12, 14 over top 202 of pack 200 (through webbing on top lid, if present), wherein the straps 12 and 14 cross again in center 206 of pack 200, over cross strap 22 and attaching to friction adapters 38 of each strap 12 and 14 (see FIG. 3C).

Figure 3D:
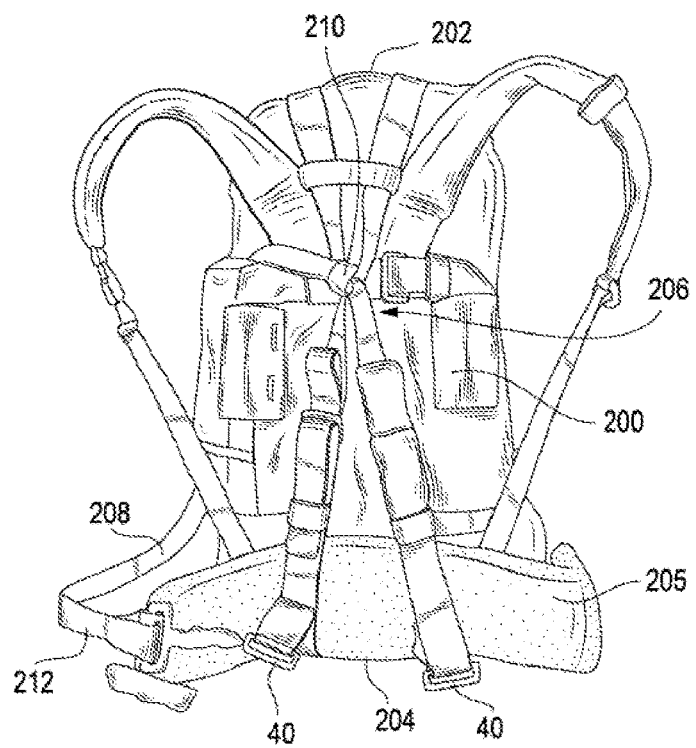
FIG. 3D is a back view of the embodiment of FIG. 3A during another step of installation of the parachute harness on a backpack.

In an image not shown, a parachutist may then turns the pack 200 over and adjusts cross strap 22 around pocket and generally centers harness 10 on pack 200. Next, all straps 12, 14, and 22 are tightened and the excess webbing is rolled up or folded upon itself and secured with retainer bands or tape (not shown). At this point, the parachutist may a attach a lowering line 208 in the by routing a loop end 210 of line 208 under crossed diagonal straps 12 and 14, and passing running end 212 of line 208 through the loop 210. Lowering line 208 may be secured to a right side of pack 200 as shown in FIG. 3D.

Figure 4:
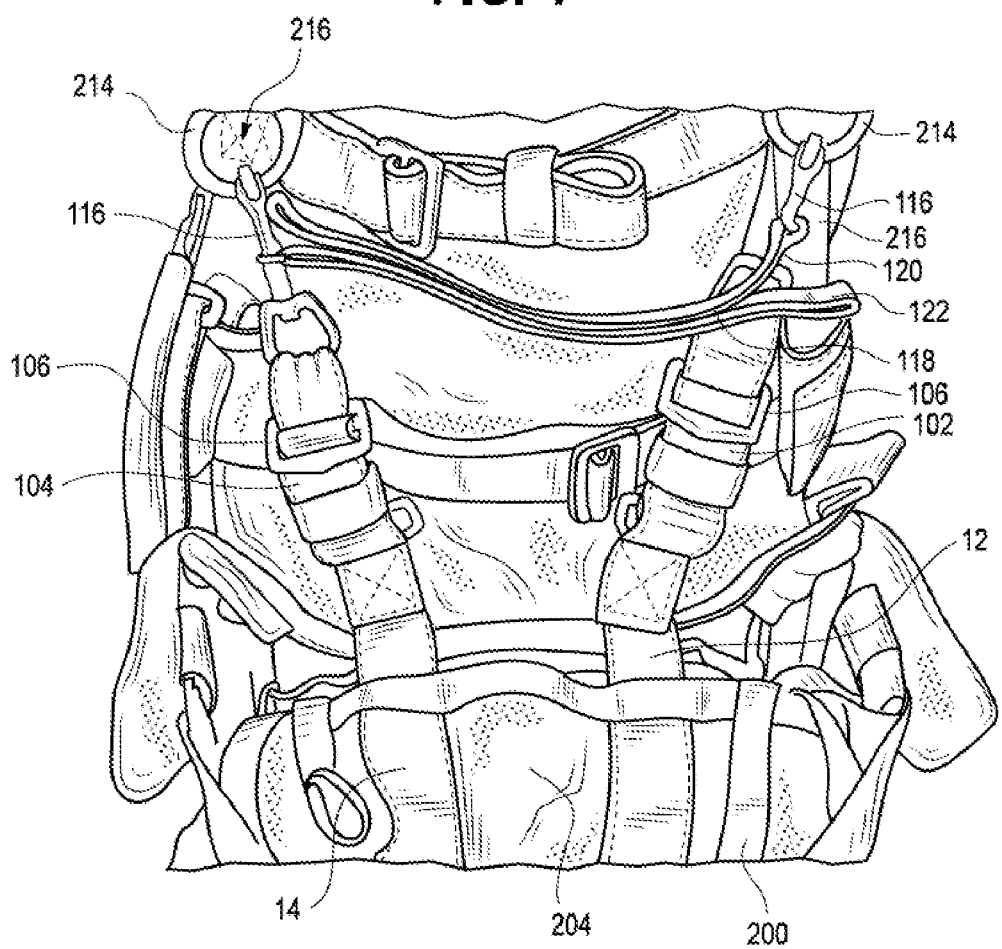
FIG. 4 is a front view of one embodiment of a harness in accordance the teachings of the present disclosure being engaged with a cargo load and being connected to a parachutist.

As shown in FIG. 4, in one embodiment of the present invention, dual point release strap assembly 100 may be used with harness 10 to attach pack 200 to a parachutist. A parachutist may attach dual point release strap assembly 100 by routing webbing straps 102 and 104 through connectors 40 on harness 10 and back into buckle/friction adapter 106 on each strap 102 and 104 of dual point release strap assembly 100. The straps 102 and 14 are then tightened to a desired length using adjuster buckle/friction adapter 106 and the remaining running end of the straps 102 and 14 are secured elastic or tape. Leash strap 118 may be adjusted by adjusting the relative position of first leash strap 120 and second leash strap 122 to conform to the width of the chest of the parachutist, the width should allow for an arch in the back of the parachutist during the flight portion of the jump. Parachutist can arch his/her chest wide to make sure leash 118 is adjusted wide enough and shackles 116 don't prematurely release.

Figure 5:
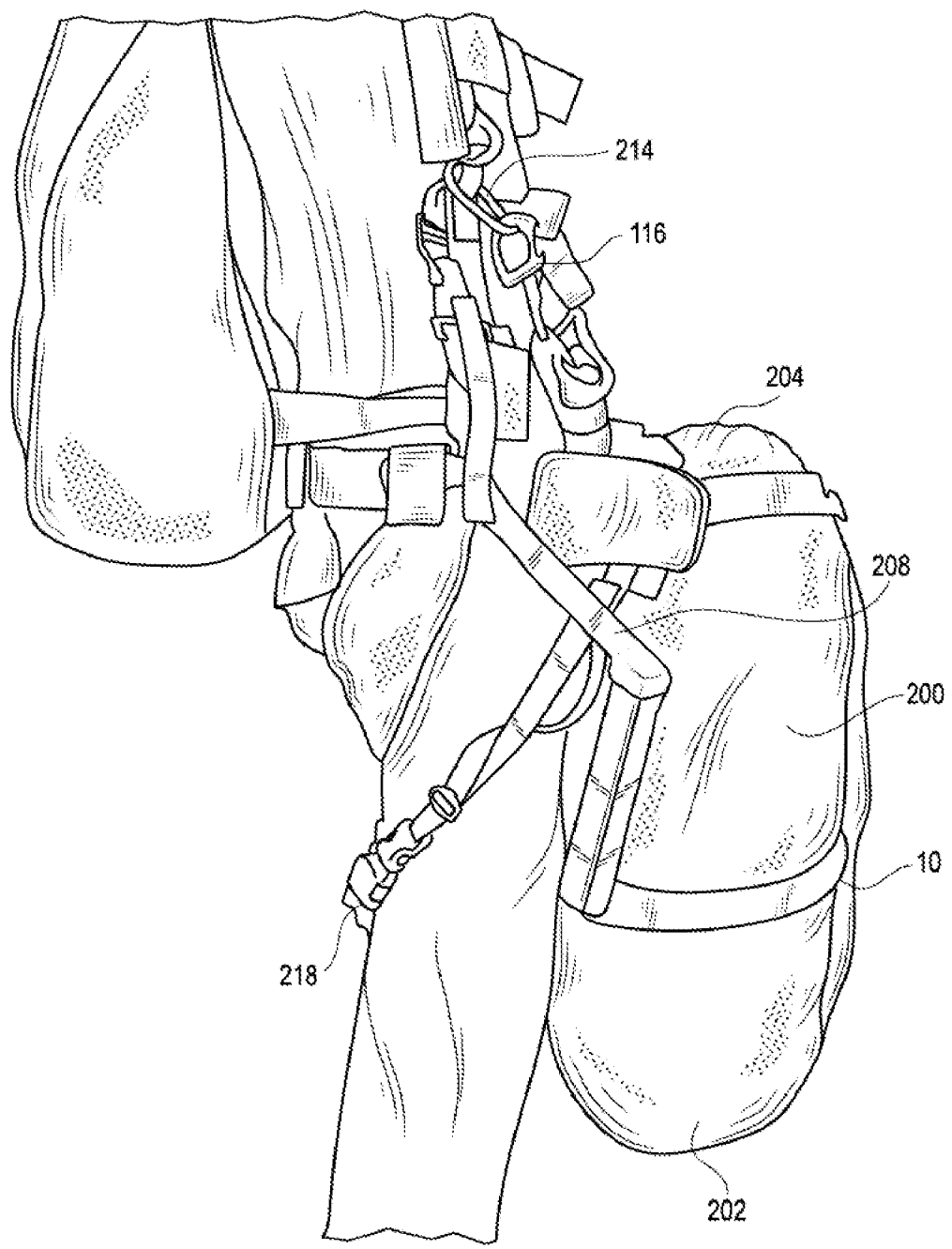
FIG. 5 is a side view of one embodiment of a harness in accordance the teachings of the present disclosure being engaged with a cargo load and being connected to a parachutist.

In one embodiment, the pack 200 may be mounted on the front of a parachutist as shown in FIGS. 4 and 5, a parachutist stands facing the rigged combat pack 200 already enveloped by harness 10 and steps through the pack shoulder straps. Open the snap shackles 116 by pulling on the first and/or second leash straps 120 and 122. The parachutist opens the snap shackles 116, then grasps the harness 10 by the attaching straps 102, 104 and secures the snap shackles 116 to a large equipment attachment ring 214 on the main lift webs 216. The harness 10 gives the parachutist a secure bundling of their pack and also a modular attachment system to hook into their own jump harness.

The parachutist attaches the ejector snap (not labeled) on the lowering line 208 to the right-side lowering line attachment V-ring (not labeled) on the parachute harness (not labeled). The parachutist then pulls on the free-running ends of the attaching straps 102 and 104, and cinches the pack 200 up to the large equipment attachment rings 214. After this, the parachutist makes sure pack 200 is level, then folds the excess webbing of straps 102 and 104 and secures the excess in the webbing retainer (not shown), which may be an elastic band, hook and loop strap, tape, or other device now known or hereafter developed.

The parachutist can then tighten the straps 102 and 104 to raise the backpack to a desired height. When in transit, the user can loosen the straps to move the backpack to a comfortable spot. Before exiting, the pack can be set back to comfortable and stable jumping height. After exiting the aircraft and parachute deployment, the user can lower the pack 200 by simply pulling the leash 118, first leash strap 120, or second leash strap 122. Alternately, each side can be released individually using individual leash straps 120 and 122 that are separated or individually activated to avoid shock and sway to the user's descent. As shown, leash 118, first leash strap 120 and second leash strap 122 are and they are situated at the chest and right in front of the of the parachutist. Once landed, the user is able to quickly de-rig harness 10 by loosening three straps 12, 14, and 22 pulling the entire assembly away from the backpack 200. The entire harness 10 can be stowed in a cargo pocket or left temporarily on the pack for hasty movement off the drop zone.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

I claim:

1. A cargo harness comprising: a first diagonal strap;
a second diagonal strap overlapping the first diagonal strap at a X-crossing, wherein said first diagonal strap is coupled to said second diagonal strap at a first joint; and
a cross strap having a first end, a second end and a sleeve disposed between said first end and said second end, wherein said first diagonal strap and said second diagonal strap pass through said sleeve and said sleeve overlaps at least a portion of said x-crossing, and
a release strap assembly operably connected to said first and second diagonal strap for connecting a cargo load to a parachute harness.

2. The cargo harness of claim 1 wherein said sleeve has a length that limits the position of the cross strap relative to the first diagonal strap and the second diagonal strap.

3. The cargo harness of claim 1 further comprising: wherein the release strap assembly includes a dual-point release strap.

4. A cargo harness comprising:
a first diagonal strap, the first diagonal strap having a first end and a second end, wherein the first end of the first diagonal strap is a free end and the second end of the first diagonal strap has a first buckle disposed thereon, and wherein a first connector is disposed proximate the second end of the first diagonal strap;
a second diagonal strap, the second diagonal strap having a first end and a second end, wherein the first end of the second diagonal strap is a free end and the second end of the second diagonal strap has a second buckle disposed thereon, and wherein a second connector is disposed proximate the second end of the second diagonal strap;
wherein the first diagonal strap and the second diagonal strap overlap in an angular orientation at a x-crossing, wherein said first diagonal strap is coupled to said second diagonal strap at a first joint; and
a cross strap having a first end, a second end and a sleeve disposed between said first end and said second end, wherein said first diagonal strap and said second diagonal strap pass through said sleeve and said sleeve proximate said x-crossing, and
a release strap assembly operably connected to said first and second diagonal strap for connecting a cargo load to a parachute harness.

5. The cargo harness of claim 4 wherein said first diagonal strap is coupled to said second diagonal strap at a second joint, said first joint having a first width, and said second joint having a second width, wherein the sleeve is disposed between the first joint and the second joint, and wherein said sleeve has a length that is less that the first width and the second width, and wherein the length of the sleeve limits the positioning of the cross strap relative to the first diagonal strap and the second diagonal strap.

6. The cargo harness of claim 4 further comprising: wherein the release strap assembly includes a dual-point release strap;
wherein said dual-point release strap includes a first connection strap and a second connection strap, wherein said first connection strap is capable to attach to the first connector of the first diagonal strap and said second connection strap is capable to attach to the second connector of the second diagonal strap.

7. The cargo harness of claim 6 further comprising:
a first releasable shackle operably connected to said first connection strap; and
a second releasable shackle operably connected to a second connection strap;
wherein the first releasable shackle and the second releasable shackle are capable to be attached to a parachute harness.

8. The cargo harness of claim 4 wherein the first diagonal strap has a first length defined by said first end of the first diagonal strap and said second end of the first diagonal strap, and the second diagonal strap has a second length defined by said first end of the second diagonal strap and said second end of the second diagonal strap, and where the first length and the second length are capable of securing a cargo load of various shapes and sizes.

9. The cargo harness of claim 4 wherein the first buckle is capable to receive the free end of the first diagonal strap, and the second buckle is capable to receive the free end of the second diagonal strap.

10. The cargo harness of claim 9 wherein the first end of the cross strap is a free end and the second end of the cross strap has a third buckle disposed thereon, wherein the third buckle is capable to receive the free end of the cross strap.

* * * * *